United States Patent
Morris et al.

(10) Patent No.: US 11,937,568 B2
(45) Date of Patent: Mar. 26, 2024

(54) CAT LITTER SCOOP

(71) Applicant: ELVI 9, LLC, Mililani, HI (US)

(72) Inventors: Elva Janese Morris, Mililani, HI (US); Michael Starkey, Kent, OH (US)

(73) Assignee: ELVI 9, LLC, Mililani, HI (US)

( * ) Notice: Subject to any disclaimer, the term of this patent is extended or adjusted under 35 U.S.C. 154(b) by 563 days.

(21) Appl. No.: 17/204,283

(22) Filed: Mar. 17, 2021

(65) Prior Publication Data
US 2021/0289741 A1    Sep. 23, 2021

Related U.S. Application Data (60) Provisional application No. 62/990,745, filed on Mar. 17, 2020.

(51) Int. Cl.
*A01K 1/01*    (2006.01)
(52) U.S. Cl.
CPC .................. *A01K 1/0114* (2013.01)
(58) Field of Classification Search
CPC ....... A01K 1/0114; A01K 23/005; B07B 1/02
USPC .................. 294/1.4, 1.5, 176, 179
See application file for complete search history.

(56) References Cited

U.S. PATENT DOCUMENTS

| | | | |
|---|---|---|---|
| 3,854,578 A | 12/1974 | Sharpe | |
| 5,190,326 A | 3/1993 | Nunn | |
| 5,238,277 A | 8/1993 | Robinson | |
| 5,741,036 A | 4/1998 | Ring | |
| 6,312,029 B1 * | 11/2001 | Renforth | A01K 1/0114 294/1.3 |
| 7,047,907 B1 | 5/2006 | Johnston | |
| 8,348,315 B2 | 1/2013 | Morris | |
| 9,428,873 B2 * | 8/2016 | Becattini, Jr. | E01H 1/1206 |
| D841,904 S * | 2/2019 | Wirth | D30/162 |
| D895,910 S * | 9/2020 | Wendling | D30/162 |
| 2006/0156991 A1 | 7/2006 | Burns et al. | |
| 2007/0277741 A1 | 12/2007 | Delman et al. | |
| 2008/0116704 A1 | 5/2008 | Botello et al. | |
| 2011/0233948 A1 | 9/2011 | Morris | |
| 2013/0292957 A1 * | 11/2013 | Paculdo | A01K 1/0114 294/179 |

(Continued)

FOREIGN PATENT DOCUMENTS

| | | |
|---|---|---|
| EP | 2166156 A1 | 3/2010 |
| FR | 2486118 A2 | 1/1982 |

(Continued)

*Primary Examiner* — Paul T Chin
(74) *Attorney, Agent, or Firm* — Thomas B. Lees, LLC (57) ABSTRACT

A cat litter scoop is provided, which includes a handle component, and a user replaceable scoop attachment. When a scoop attachment is inserted into the handle component, a scoop body contacts with a grip area within the body of the handle component. Further insertion force deflects the grip allowing the body of the scoop attachment to pass over grip teeth. The force of the deflection in concert with the geometry of the grip teeth help to retain the scoop attachment within the handle portion When a button is depressed, a protrusion beneath the button is translated into contact with the grip via a contact surface. As the button is further depressed, it deflects the grip in the same direction as the travel of the button. This move's the grip's teeth away from the scoop allowing the scoop to release from the handle component.

20 Claims, 10 Drawing Sheets

(56) References Cited

U.S. PATENT DOCUMENTS

2016/0324115 A1* 11/2016 Bridges ................ A01K 1/0114
2018/0140140 A1* 5/2018 Wilson .................. B26B 11/008

FOREIGN PATENT DOCUMENTS

GB 2478937 A 9/2011
GB 2478937 B 12/2014

* cited by examiner

CAT LITTER SCOOP

CROSS REFERENCE TO RELATED APPLICATIONS

This application claims the benefit of U.S. Provisional Patent Application Ser. No. 62/990,745, filed Mar. 17, 2020, entitled "CAT LITTER SCOOP", the disclosure of which is hereby incorporated by reference.

BACKGROUND

Various aspects of the present disclosure relate generally to a cat litter scoop, and more particularly, to a cat litter scoop having a handle that attaches to, and detaches from, biodegradable scoop attachments.

Cat litter scoops typically include a handle and a scoop that integrally extends from the handle. The scoop forms a bucket or shovel and is used to remove solid waste from litter in a cat litter box. Moreover, the scoop often includes slots that allow the user to sift through the litter to remove the solid waste, leaving the litter in the cat litter box.

BRIEF SUMMARY

According to aspects of the present disclosure herein, a cat litter scoop comprises a handle portion, a release, and a lock. The handle portion has a top surface, a front end having a front surface, and a back end. In this configuration, the front surface has an attachment opening therein for receiving a scoop attachment. The release comprises a button that extends from the top surface of the handle portion, e.g., into the handle portion, and a shoulder that attaches to the button. The shoulder has a button protrusion extending downward away from the button. Also, the release comprises a release arm that extends from the shoulder rearward towards the back end of the handle portion. The lock is positioned within the handle portion and comprises a grip area positioned proximate to the attachment opening, which engages a scoop body of the scoop attachment. The lock also comprises a release contact area coupled to the grip area, and a lock arm that extends from the release contact area rearward towards the back end of the handle portion. Moreover, the handle portion includes a common securement that fixedly holds a distal end portion of the release arm and a distal end portion of the lock arm, such that the release and the lock can pivot within the handle portion about the common securement.

According to further aspects of the present disclosure, a cat litter scoop comprises a handle portion having a release and a lock. The handle portion has an attachment opening therein for receiving a scoop attachment. The release has a button that extends from the handle portion, a shoulder having a button protrusion extending downward away from the button, and a release arm that extends from the shoulder rearward towards a back end of the handle portion. The lock has a grip area having a top surface that includes a lock tooth. The lock tooth has an incline that slopes away from the attachment opening, and a lock surface opposite the attachment opening. A release contact area is coupled to the grip area, a lock arm extends from the release contact area rearward towards the back end of the handle portion. The handle portion also includes a common securement that fixedly holds a distal end portion of the release arm and a distal end portion of the lock arm, such that the release and the lock can pivot within the handle portion about the common securement.

DETAILED DESCRIPTION

Figure 1A:
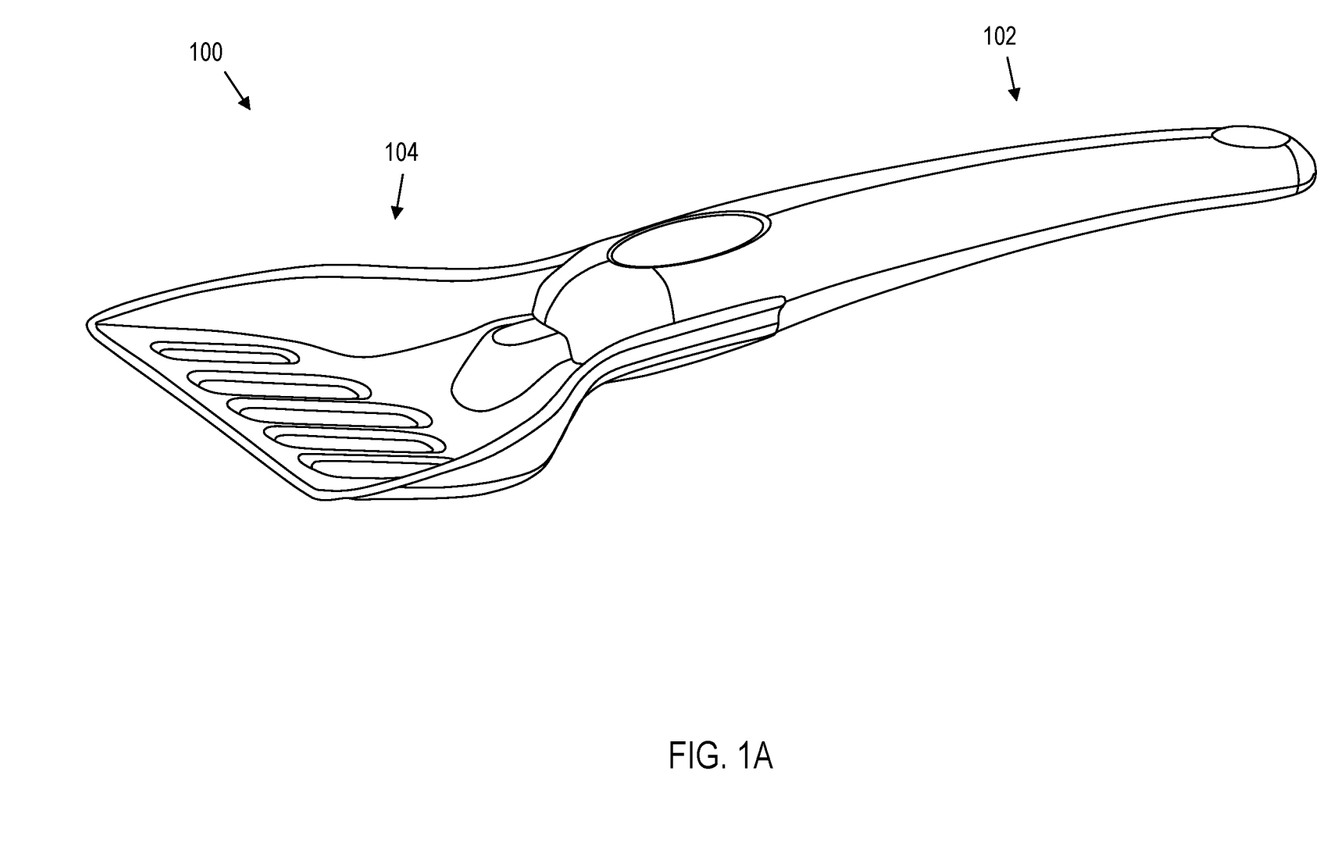
FIG. 1A is a perspective view of a cat litter scoop, according to aspects of the present disclosure.

Referring now to the drawings, and in particular to FIG. 1A, an example cat litter scoop 100 is illustrated. The cat litter scoop 100 comprises generally, a handle portion 102 and a scoop attachment 104 that is user attachable to, and detachable from the handle portion 102. As will be described in greater detail herein, the scoop attachment 104 is received into the handle portion 102 such that a user is not required to touch the scoop attachment 104, e.g., for removal from the handle portion 102. This allows a user to scoop solid waste from a litter box, and dispose of the scoop attachment with the solid waste. In certain embodiments, the scoop attachment 104 is biodegradable, resulting in an environmentally friendly, and sanitary way to clean a litter box.

Figure 1B:
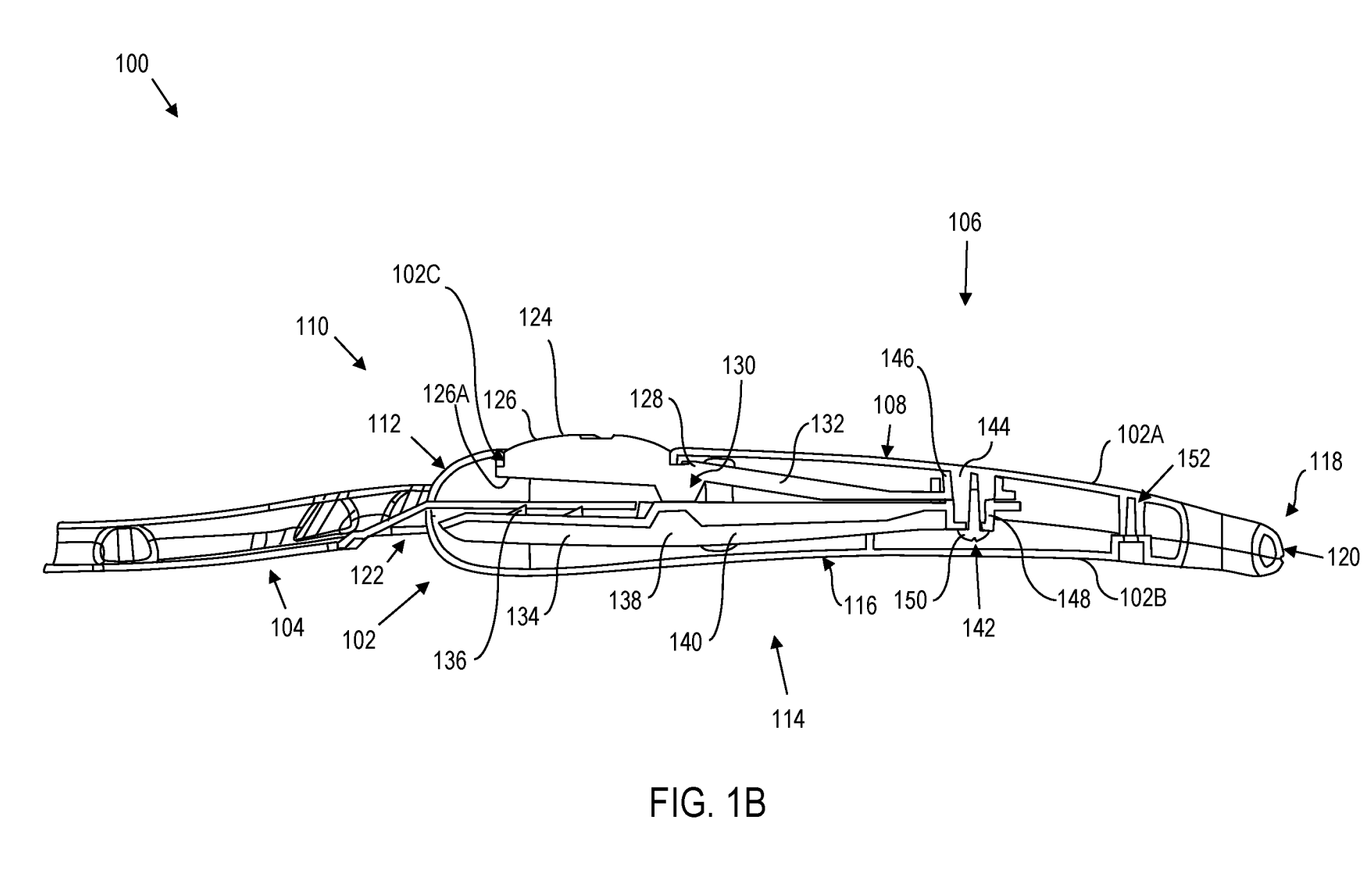
FIG. 1B is a side, cross-sectional view of the cat litter scoop of FIG. 1A, according to aspects of the present disclosure.

Referring now to FIG. 1B, a view illustrates a cross-section taken lengthwise along the handle portion 102 and the scoop attachment 104 of the cat litter scoop 100, to illustrate an example structure for attaching and removing the scoop attachment 104 from the handle portion 102.

As specifically illustrated in FIG. 1B, following around the handle portion 102 in a counterclockwise direction, the handle portion 102 has a top side 106 having a top surface 108 a front end 110 having a front surface 112, a bottom side 114 having a bottom surface 116, and a back end 118 having a back surface 120.

Focusing now where the handle portion 102 and the scoop attachment 104 meet, the front surface 112 of the handle portion 102 has an attachment opening 122 therein, for receiving the scoop attachment 102, as will be described in greater detail herein. In some embodiments, the attachment opening 122 extends from the front end 110 along at least a portion of opposing sides of the handle portion 102. In this regard, the configuration of the attachment opening 122 will depend upon the mating configuration of the corresponding scoop attachment 102, examples of which are set out herein.

The cat litter scoop 100 also includes a release 124. The release 124 is comprised of a button 126 that extends from the top surface 108 of the handle portion 102 (e.g., by extending through an aperture in top side 106 of the handle portion 102, and optionally extending into the handle portion 102). The release 124 also comprises a shoulder 128 that attaches to the button 126 within the handle portion 102. The shoulder 128 has a button protrusion 130 extending downward away from the button 126. The release 124 also comprises a release arm 132 that extends from the shoulder 128 rearward towards a back end of the handle portion 102. In this manner, in the illustrated example, the shoulder 128, button protrusion 130, and release arm 132 are positioned within the handle portion 102.

The cat litter scoop still further includes a lock 134 that is positioned within the handle portion 102. The lock 134 comprises a grip area 136 positioned proximate to the attachment opening 122, which engages a scoop body of the scoop attachment 104. The lock 134 also comprises a release contact area 138 coupled to the grip area 136. Moreover, the lock 134 comprises a lock arm 140 that extends from the release contact area 138 rearward towards a back end of the handle portion 102.

In the illustrated configuration, the handle portion 102 includes a common securement 142 that fixedly holds a distal end portion of the release arm 132 and a distal end portion of the lock arm 140, such that the release 124 and the lock 134 can pivot within the handle portion 102 about the common securement 142.

According to some embodiments of the present disclosure, the common securement 142 is defined by a boss 144 within the handle portion 102. In this configuration, the release arm 132 includes a release aperture 146 that engages the boss 144. Analogously, the lock arm 140 includes a lock aperture 148 that engages the boss 144. Here, a fastener, such as a screw 150, is utilized to lock the release arm 132 and the lock arm 140 to the boss 144.

In an example embodiment, the handle portion 102 is formed from a pair of clamshell handle members, e.g., a top clamshell handle member 102A and a bottom clamshell handle member 102B that connect together to define a hollow therein for holding the release 124 and lock 134. For instance, the top clamshell handle member 102A and the bottom clamshell handle member 102B can include mating securements 152, e.g., screws, mounts, bosses, clips, tabs, snaps, pins, glued edges, sealed edges, bonded edges, etc., to hold the clamshell halves together. Thus, as illustrated, the lock 134 is contained within a hollow of the handle portion 102, and the release 124 is at least substantially contained within the hollow. In some embodiments, the button 126 of the release 124 extends from the top surface 108 of the handle portion 102. For instance, as illustrated, the button 126 further comprises a lip 126A within the handle portion 102. Correspondingly, the handle portion 102 includes a catch 102C that abuts the lip 126A when the button 126 is not depressed. This keeps the button 126 from releasing from the handle portion. The release arm 132 is flexible, but is configured to normally bias the button 126 to extend upward through the handle portion 102 so that the lip 126A engages the catch 102C when the button 126 is not being depressed. In other embodiments, the button 126 can be contained within the handle portion 102, e.g., below a membrane, or other suitable structure.

Figure 2:
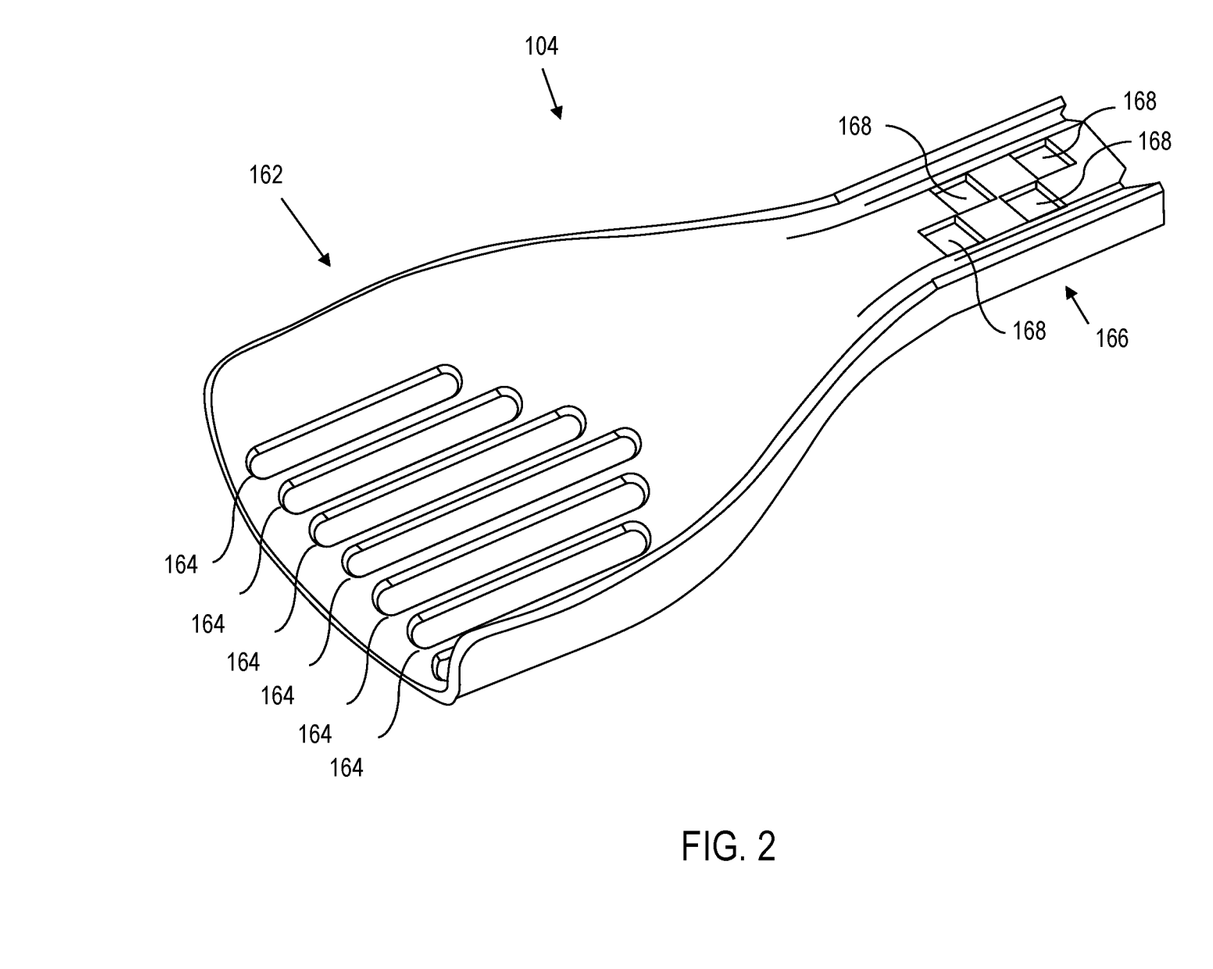
FIG. 2 is a perspective view of an example biodegradable scoop attachment that attaches to, and detaches from a handle portion, according to aspects of the present disclosure

Referring to FIG. 2, the scoop attachment 104 comprises in general, a scoop shovel 162 that includes a sifting feature 164, e.g., slots, holes other shapes, combinations thereof, etc., that allow finer material, e.g., cat litter, to fall out of/sift through the shovel 162, leaving larger matter, e.g., solid waste collected from a litter box, on the shovel 162. The shovel 162 transitions into a scoop body 166 that mates with the grip area 136 of the lock 134 in the handle portion 102 (shown in FIG. 1). In this regard, the scoop body 166 includes one or more lock receiver(s) 168 positioned there along. Each lock receiver 168 can comprise an aperture, detent, shaped receiving well, etc., the function of which is described in greater detail herein.

Figure 3:
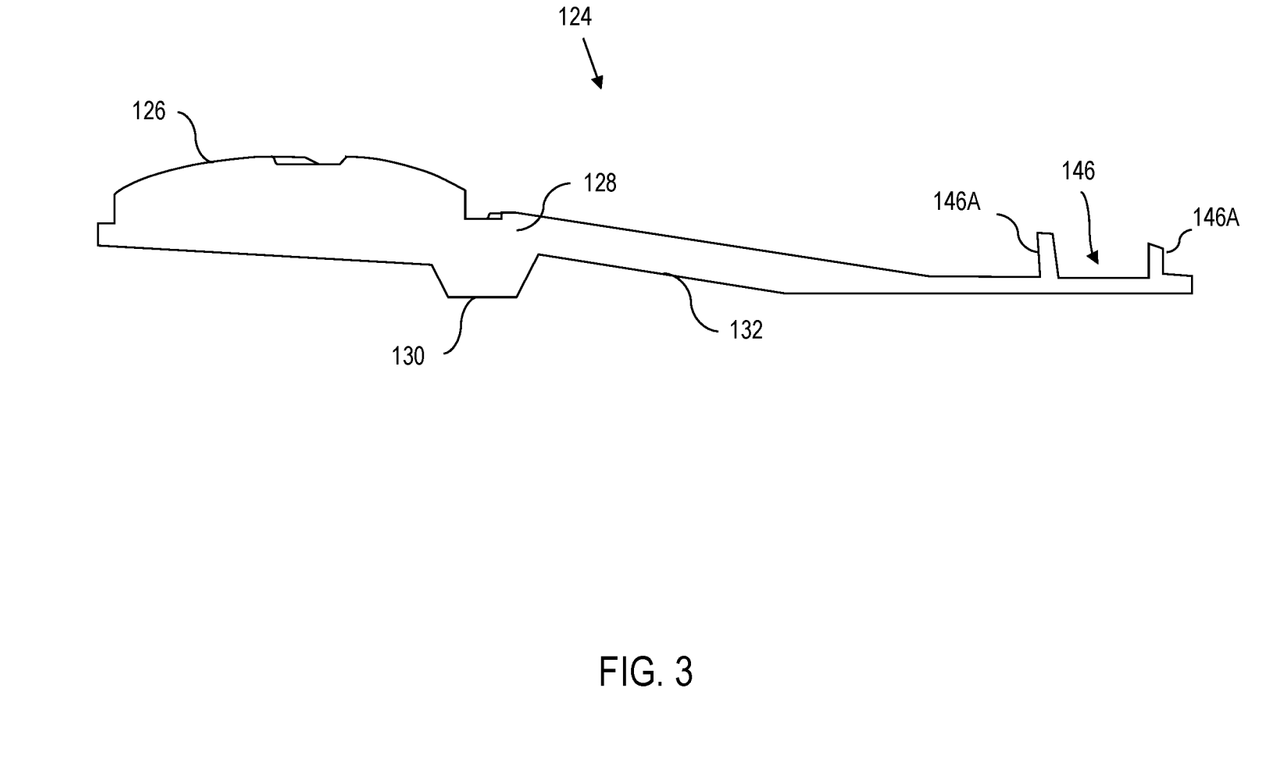
FIG. 3 is a perspective view of an example release of a cat litter scoop, according to aspects of the present disclosure.

Referring to FIG. 3, the release 126 (FIG. 1B) is illustrated in detail, removed from the handle portion 102 (FIG. 1B) for clarity of discussion. The button 126 of the release 124 is operated by a user to release the scoop attachment 104 from the handle portion 102. In this regard, the button 126 can take on any shape, e.g., suitable for depression by a thumb of the user. Regardless, the button 126 is operated to cause the scoop attachment 104 to release from the handle portion 102 without requiring the user to touch the scoop attachment 104. The shoulder 128 serves as a transition from the button 126 to the release arm 132. Moreover, the shoulder 128 supports the button protrusion 130, which extends downward and away from a dome of the button 126. As illustrated, the release aperture 146 is shaped as an aperture adjacent to a flanged member 146A that provides support and coupling about an outer circumference of the boss 144 (FIG. 1).

Figure 4:
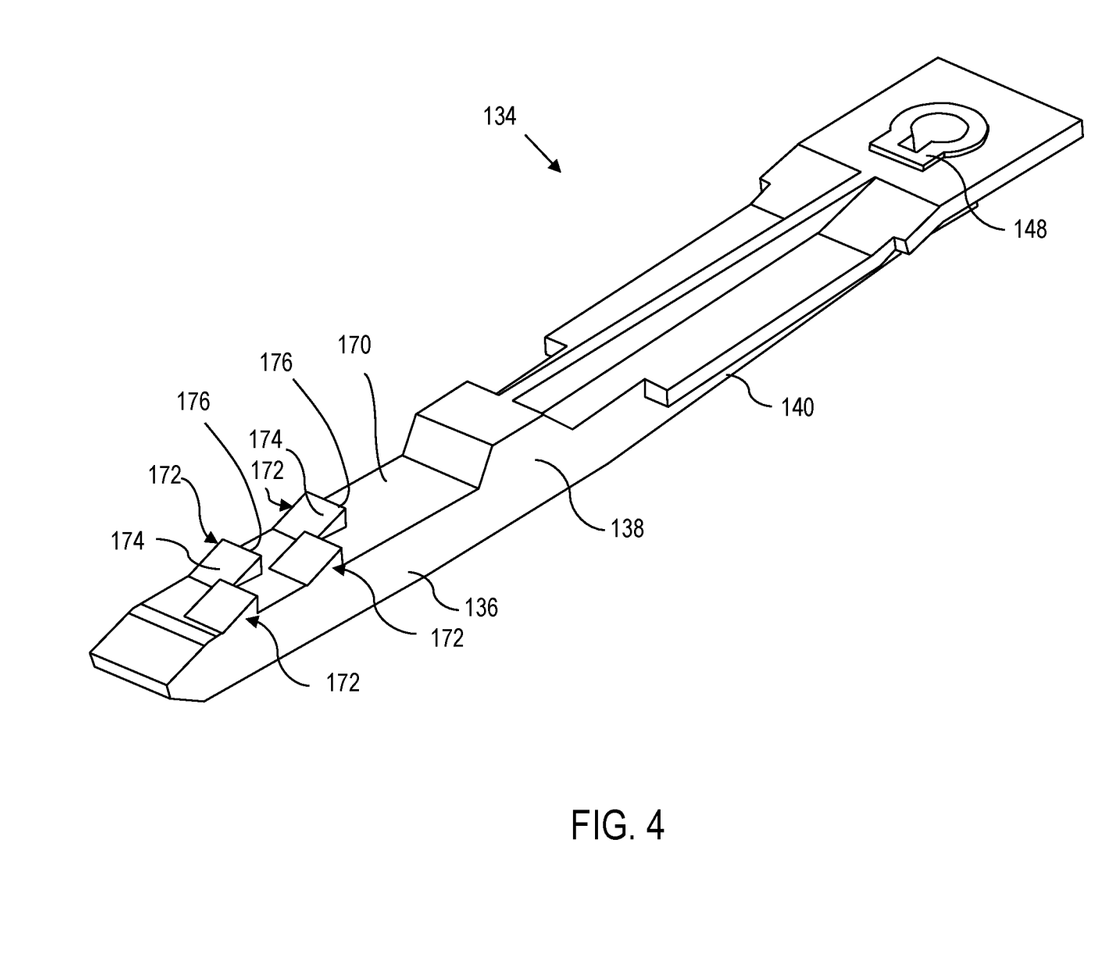
FIG. 4 is a perspective view of an example lock of a cat litter scoop, according to aspects of the present disclosure.

Referring to FIG. 4, the lock 134 (FIG. 1B) is illustrated in detail, removed from the handle portion 102 (FIG. 1B) for clarity of discussion. According to an example embodiment, the grip area 136 of the lock 134 has a top surface 170 that includes a lock tooth 172. The lock tooth 172 comprises an incline 174 (that when installed in the handle component 102, slopes away from the attachment opening 122), and a lock surface 176 (e.g., opposite the attachment opening 122 when the lock 134 is installed in the handle component 102). As such, in this implementation, the lock tooth 172 is shaped like an inclined wedge with a right triangle side profile. In practice, other tooth shapes can be implemented.

Generally, the size, number, and positioning of the lock tooth 172 (or lock teeth 172) will correspond with the lock receiver 168 (or lock receivers 168) in the scoop attachment 102 (FIG. 2). In the example illustrated, there are four lock teeth 172 arranged in a "staggered" pattern configured to match with and mate to four lock receivers 168 (FIG. 2), which are arranged in a similar staggered pattern. In practical applications, there can be one lock tooth 172, or a plurality of lock teeth 172 arranged in any desired pattern. Correspondingly, one lock receiver 168, or a plurality of lock receivers 168

With reference generally, to FIG. 1A, FIG. 1B, and FIGS. 2-4, the lock 134 is structurally configured to deflect, such that when the scoop body 166 of the scoop attachment 104 is inserted through the attachment opening 122 of the handle portion 102, and the scoop body 166 is pushed against the grip area 136, the scoop body 166 causes the lock 134 to deflect (e.g., pivot about the common securement 142) until the lock tooth 172 engages a corresponding lock receiver 168 on the scoop body 166, thereby locking the scoop attachment 104 to the handle body 102. In this regard, the incline 174 of the lock tooth 172 assists with the pivot motion of the lock 134. When the lock receiver 168 aligns with the lock tooth 172, a forward side wall of the lock receiver slips over the peak of the incline 174, allowing the lock 134 to pivot back to a default position. When locked into position, each lock tooth 172 is received into a corresponding lock receiver 168.

Referring back to FIG. 4, in the particular implementation illustrated, it can be seen that the grip area 136 of the lock 134 includes at least one additional lock tooth 172. For instance, as illustrated, there are four lock teeth 172, arranged in two rows of two teeth 172. Moreover, each row is staggered relative to the adjacent row. In this regard, and with reference back to FIG. 2, the scoop body 166 includes at least one additional lock receiver 168 (four total lock receivers 168 illustrated), each lock receiver 168 arranged to engage a corresponding one of the lock teeth 172.

With reference once more, to FIG. 1B, the button protrusion 130 on the shoulder 128 of the release 124 aligns with the release contact area 138 of the lock 134. Additionally, as best illustrated in FIG. 1B, FIG. 2, and FIG. 4, the button protrusion 130 and the release contact 138 are floated within the handle portion 102, such that upon a user pressing the button 126, the button protrusion 130 of the release 124 contacts the release contact 138 of the lock 134. This causes the release arm 132 and the lock arm 140 to each pivot about the common securement 142 in the same direction as the travel of the button 126. This action allows each lock receiver 168 of the scoop body 166 to release from the associated lock tooth 172 within the grip area 136. This in turn, allows the scoop attachment 104 to release from the handle portion 102 without requiring a user to touch the scoop attachment.

Figure 5:
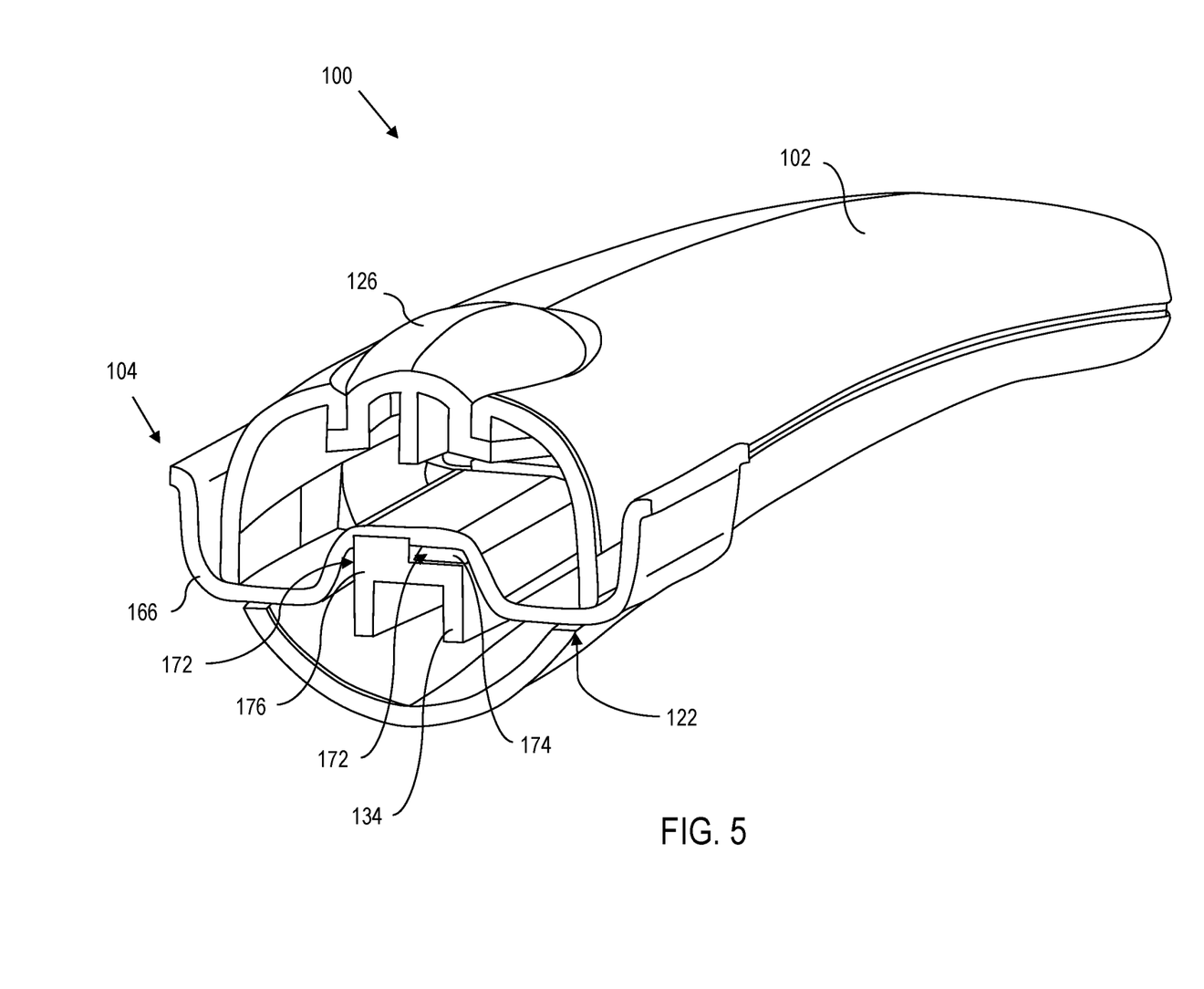
FIG. 5 is a perspective view of a handle portion of a cat litter scoop showing a cross-sectional view exposing a relationship between a lock and scoop attachment, according to aspects of the present disclosure.

With reference to FIG. 5, an example cat litter scoop 100 is illustrated with a cross section cut out across laterally (orthogonal to the length of the handle portion 102), just above the button 126. Here, a lock surface 176 of a tooth 172, and an incline 174 of a lock tooth 172 are illustrated for clarity purposes.

In this example implementation, the attachment opening 122 wraps from the front end of the handle housing 102 around to opposite sides of the handle portion 102 such that when the scoop attachment 104 is installed in the handle portion 102, edges of the scoop body 166 of the scoop attachment 104 extend out of the handle portion 102. This allows "wings" of the scoop body 166 to "flank" the handle portion 102, thus ensuring a positive coupling of the scoop attachment 104 to the handle body 102. Here, the cross-section of the scoop body 166 forms generally, a "W" shape.

Figure 6:
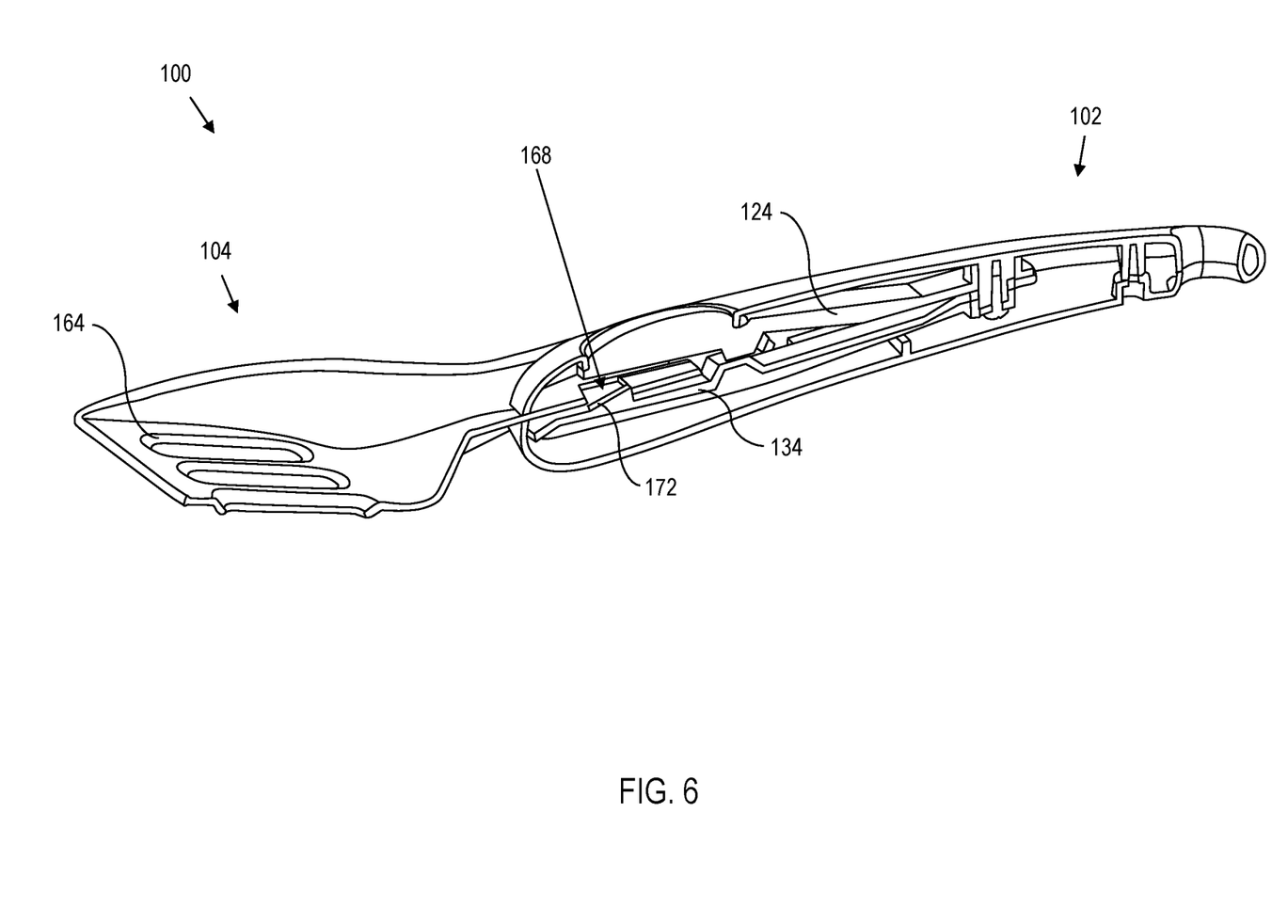
FIG. 6 is a cross-sectional view of an alternate embodiment of a cat litter scoop, according to aspects of the present disclosure.
Figure 7:
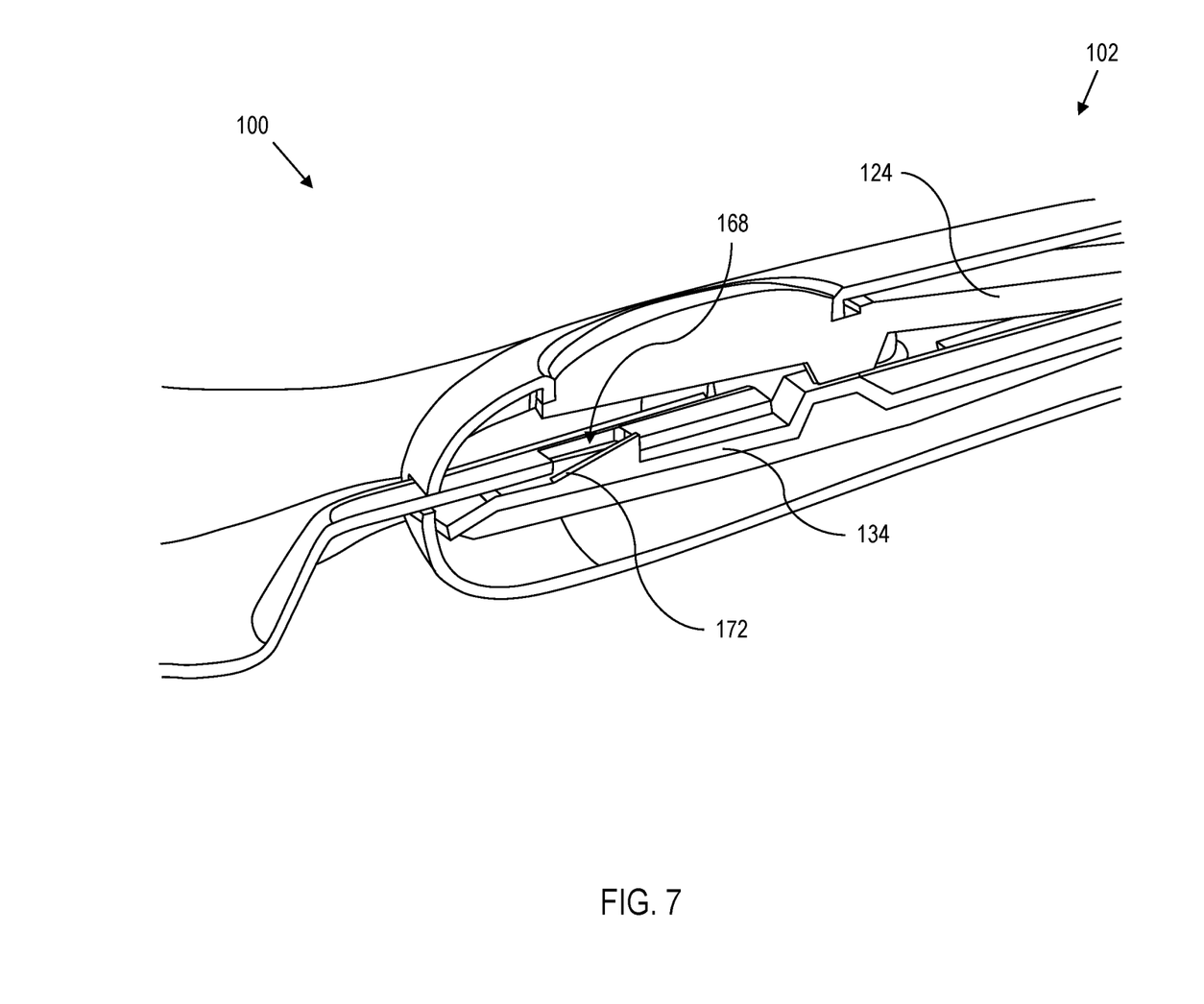
FIG. 7 is a cross-sectional view of a locking mechanism and corresponding lock receiver of the cat litter scoop of FIG. 6, according to aspects of the present disclosure.
Figure 8:
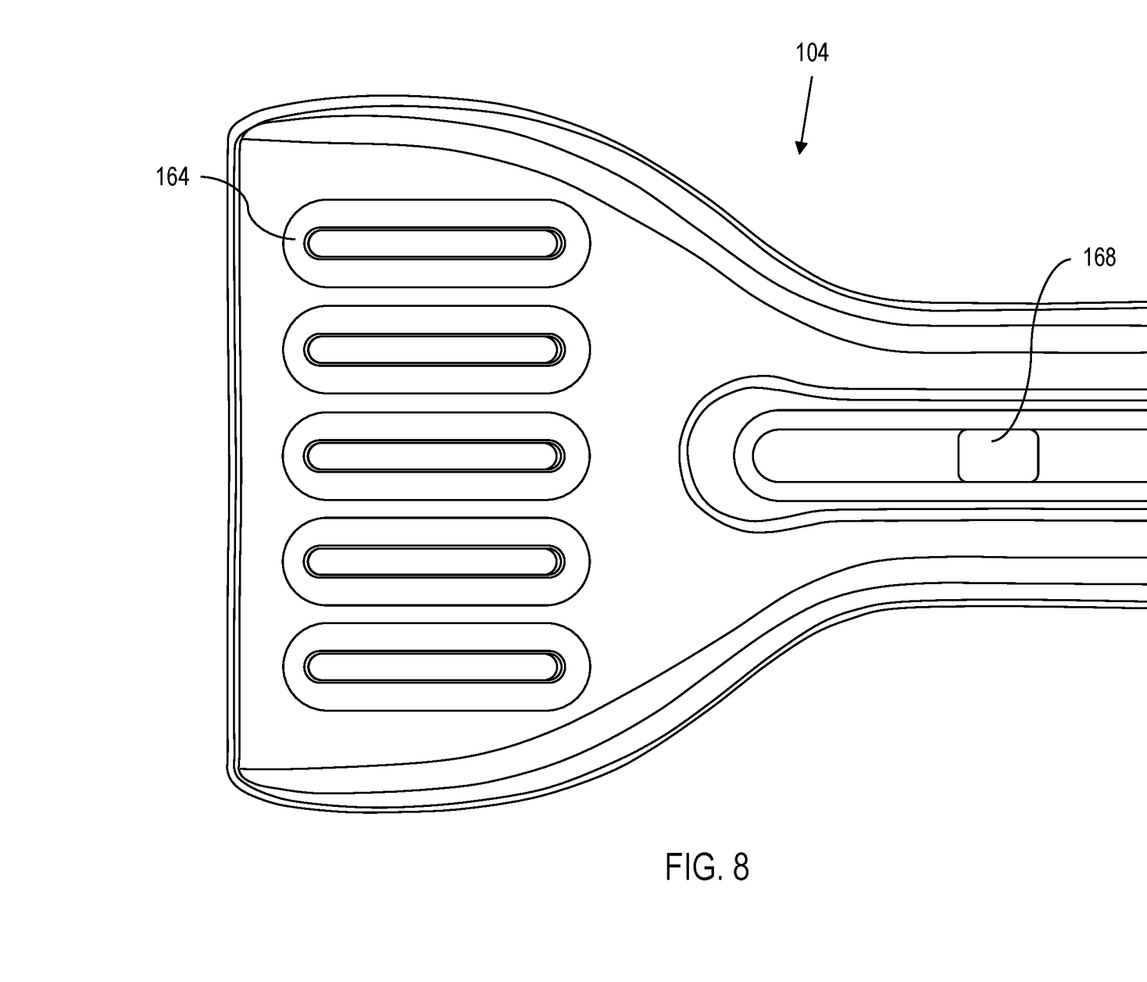
FIG. 8 is a top view of a scoop attachment of the cat litter scoop of FIGS. 6-7, according to aspects of the present disclosure.

Referring now to FIGS. 6-8, an alternate embodiment of the cat litter scoop 100 includes similar features of the example embodiment of FIG. 1A, FIG. 1B, and FIGS. 2-4, but shows an example of a single lock tooth and corresponding lock receiver. For example, the alternate embodiment of the cat litter scoop 100 includes a handle portion 102 and a scoop attachment 104 that is user attachable to, and detachable from the handle portion 102. Further, the alternate embodiment of the cat litter scoop 100 includes a release 124 similar to the release 124 of FIG. 1B and FIG. 3. However, the lock 134 of the alternate embodiment 100 is different than the lock 134 of FIG. 4. Instead of four lock teeth as best illustrated in FIG. 4, the alternate embodiment 100 of FIGS. 6-8 includes only one lock tooth 172 on the lock 134. Correspondingly, the scoop attachment 104 of the alternate embodiment 100 of FIGS. 6-8 includes one lock receiver 168 (FIG. 8). Other embodiments may have any number of lock teeth and corresponding lock receivers.

Further, FIG. 8 illustrates an alternate embodiment of the sifting feature 164 of the scoop attachment 104. As illustrated in FIG. 2, the sifting features 164 are different sizes. However, the sifting features 164 of FIG. 8 are the same size. Other dimensions may be used for sifting features of either embodiment of the scoop attachment shown in FIGS. 2 and 8.

Figure 9:
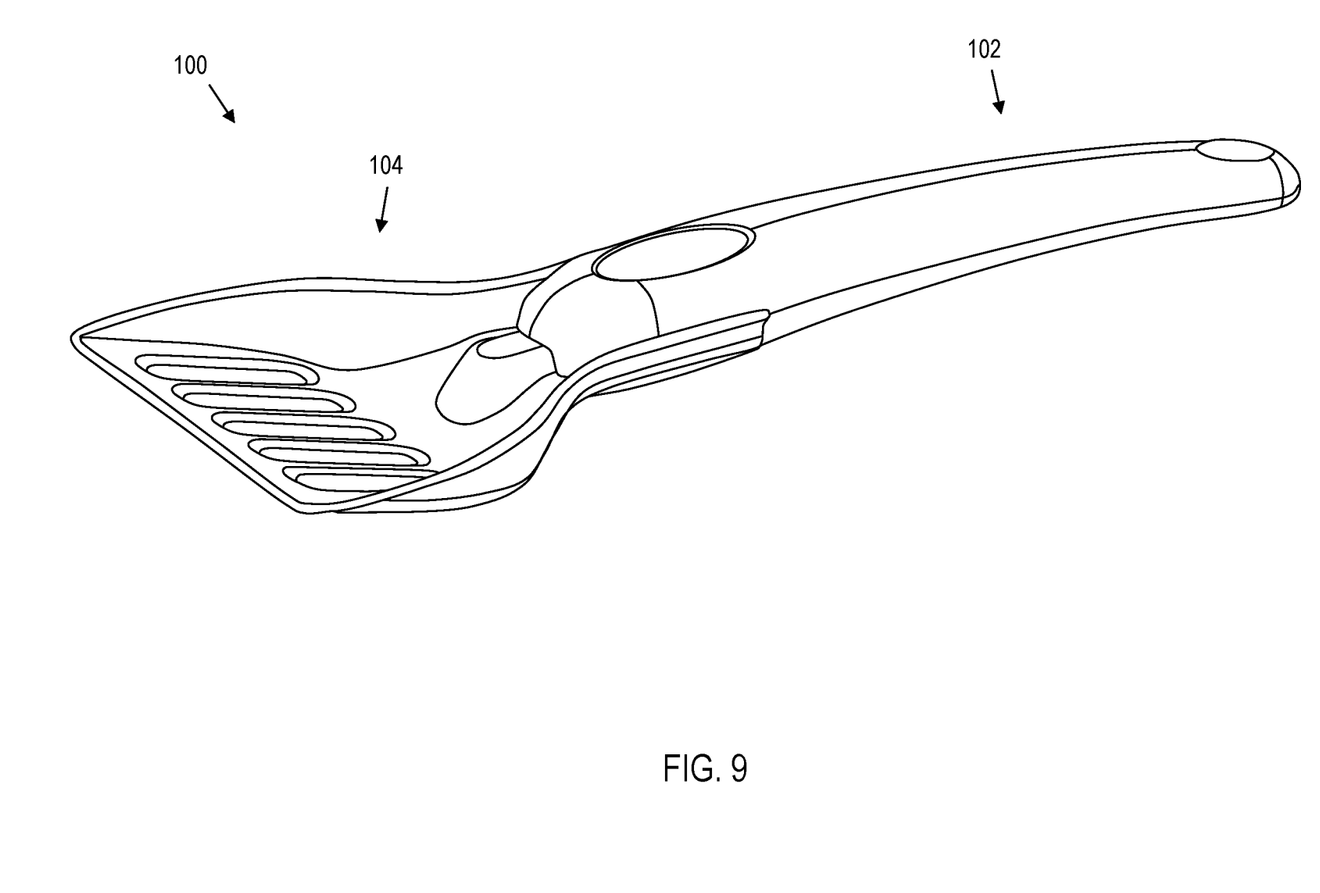
FIG. 9 is a perspective view of a scoop attachment coupled to a handle portion to create a cat litter scoop, according to aspects of the present disclosure.

FIG. 9 illustrates the handle 102 and the scoop attachment 104 coupled together for the cat litter scoop 100 to be used. As shown, the scoop attachment 104 of FIG. 8 is used. However, any embodiment of the scoop attachment 104 may be used, as long as the handle has corresponding teeth (as discussed above).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A cat litter scoop comprising:
    a handle portion having a top surface, a front end having a front surface, and a back end, the front surface having an attachment opening therein for receiving a scoop attachment;
    a release having:
        a button that extends from the top surface of the handle portion;
        a shoulder that attaches to the button, the shoulder having a button protrusion extending downward away from the button; and
        a release arm that extends from the shoulder rearward towards the back end of the handle portion; and
    a lock positioned within the handle portion, the lock having:
        a grip area positioned proximate to the attachment opening, which engages a scoop body of the scoop attachment;
        a release contact area coupled to the grip area; and
        a lock arm that extends from the release contact area rearward towards the back end of the handle portion;
    wherein:
        the handle portion includes a common securement that fixedly holds a distal end portion of the release arm and a distal end portion of the lock arm, such that the release and the lock can pivot within the handle portion about the common securement.

2. The cat litter scoop of claim 1, wherein:
    the common securement is defined by a boss within the handle portion;

the release arm includes a release aperture that engages the boss;

the lock arm includes a lock aperture that engages the boss; and a fastener locks the release arm and the lock arm to the boss.

3. The cat litter scoop of claim 1, wherein:

the grip area of the lock has a top surface that includes a lock tooth having an incline that slopes away from the attachment opening, and a lock surface opposite the attachment opening.

4. The cat litter scoop of claim 3, wherein:

the lock is structurally configured to deflect, such that when the scoop body of the scoop attachment is inserted through the attachment opening of the handle portion and is pushed against the grip area, the scoop body causes the lock to deflect until the lock tooth engages a lock receiver on the scoop body, thereby locking the scoop attachment to the handle body.

5. The cat litter scoop of claim 4, wherein:

the grip area of the lock includes at least one additional lock tooth; and the scoop body includes at least one additional lock receiver, each lock receiver arranged to engage a corresponding one of each additional lock tooth.

6. The cat litter scoop of claim 1, wherein:

the button protrusion on the shoulder of the release aligns with the release contact area of the lock; and the button protrusion and the release contact are floated within the handle portion, such that upon pressing the button, the button protrusion contacts the release contact.

7. The cat litter scoop of claim 6, wherein:

the button protrusion contacts the release contact so as to cause the release arm and the lock arm to each pivot about the common securement in the same direction as the travel of the button, and allow the lock receiver to release from the lock tooth, which in turn, allows the scoop attachment to release from the handle portion without requiring a user to touch the scoop attachment.

8. The cat litter scoop of claim 1, wherein:

the grip area of the lock has a top surface that includes lock teeth, each lock tooth having an incline that slopes away from the attachment opening, and a lock surface opposite the attachment opening, the lock teeth arranged in at least two rows of at least two lock teeth, wherein each row is staggered relative to an adjacent row.

9. The cat litter scoop of claim 1, wherein the handle portion comprises a pair of clamshell handle members that connect together to define a hollow therein for holding the release and lock.

10. The cat litter scoop of claim 1, wherein:

the button further comprises a lip within the handle portion; and the handle portion includes a catch that abuts the lip when the button is not depressed.

11. The cat litter scoop of claim 1, wherein:

the attachment opening wraps from the front end around to opposite sides of the handle portion such that when the scoop attachment is installed in the handle, edges of a scoop body of the scoop attachment extend out of the handle portion.

12. The cat litter scoop of claim 11, wherein:

the attachment opening forms a generally "W" shape.

13. A cat litter scoop comprising:

a handle portion having an attachment opening therein for receiving a scoop attachment;

a release having:
 a button that extends from the handle portion;
 a shoulder that attaches to the button, the shoulder having a button protrusion extending downward away from the button; and
 a release arm that extends from the shoulder rearward towards a back end of the handle portion; and a lock having:
 a grip area of the lock having a top surface that includes a lock tooth having an incline that slopes away from the attachment opening, and a lock surface opposite the attachment opening;
 a release contact area coupled to the grip area; and
 a lock arm that extends from the release contact area rearward towards the back end of the handle portion;

wherein:

the handle portion includes a common securement that fixedly holds a distal end portion of the release arm and a distal end portion of the lock arm, such that the release and the lock can pivot within the handle portion about the common securement.

14. The cat litter scoop of claim 13, wherein:

the common securement is defined by a boss within the handle portion;

the release arm includes a release aperture that engages the boss;

the lock arm includes a lock aperture that engages the boss; and a screw locks the release arm and the lock arm to the boss.

15. The cat litter scoop of claim 13, wherein:

the lock is structurally configured to deflect, such that when the scoop body of the scoop attachment is inserted through the attachment opening of the handle portion and is pushed against the grip area, the scoop body causes the lock to deflect until the lock tooth engages a lock receiver on the scoop body, thereby locking the scoop attachment to the handle body.

16. The cat litter scoop of claim 15, wherein:

the grip area of the lock includes at least one additional lock tooth; and the scoop body includes at least one additional lock receiver, each lock receiver arranged to engage a corresponding one of each additional lock tooth.

17. The cat litter scoop of claim 13, wherein:

the button protrusion on the shoulder of the release aligns with the release contact area of the lock; and the button protrusion and the release contact are floated within the handle portion, such that upon pressing the button, the button protrusion contacts the release contact.

18. The cat litter scoop of claim 13, wherein:

the button protrusion contacts the release contact so as to cause the release arm and the lock arm to each pivot about the common securement in the same direction as the travel of the button, and allow the lock receiver to release from the lock tooth, which in turn, allows the scoop attachment to release from the handle portion without requiring a user to touch the scoop attachment.

19. The cat litter scoop of claim 13, wherein:

the grip area of the lock has a top surface that includes lock teeth, each lock tooth having an incline that slopes away from the attachment opening, and a lock surface opposite the attachment opening, the lock teeth arranged in at least two rows of at least two lock teeth, wherein each row is staggered relative to an adjacent row.

20. The cat litter scoop of claim 13, wherein:

the handle portion comprises a pair of clamshell handle members that connect together to define a hollow therein for holding the release and lock;

the attachment opening wraps from the front end around to opposite sides of the handle portion such that when the scoop attachment is installed in the handle, edges of a scoop body of the scoop attachment extend out of the handle portion; and the attachment opening forms a generally "W" shape.

\* \* \* \* \*